United States Patent
Fiseni et al.

(10) Patent No.: US 9,641,054 B2
(45) Date of Patent: May 2, 2017

(54) SEGMENTED MAGNET COMPONENT FOR ELECTRIC MACHINE AND METHOD OF ASSEMBLY

(71) Applicant: General Electric Company, Schenectady, NY (US)

(72) Inventors: Alexander Felix Fiseni, Munich (DE); Mohamed Osama, Garching (DE); Francesco Papini, Munich (DE)

(73) Assignee: General Electric Company, Niskayuna, NY (US)

( * ) Notice: Subject to any disclaimer, the term of this patent is extended or adjusted under 35 U.S.C. 154(b) by 647 days.

(21) Appl. No.: 13/896,667

(22) Filed: May 17, 2013

(65) Prior Publication Data

US 2014/0339945 A1    Nov. 20, 2014

(51) Int. Cl.
*H02K 15/03*      (2006.01)
*H02K 1/27*      (2006.01)

(52) U.S. Cl.
CPC ........... *H02K 15/03* (2013.01); *H02K 1/2766* (2013.01); *Y10T 29/49012* (2015.01)

(58) Field of Classification Search
CPC .......... H02K 1/276; H02K 1/278; H02K 1/27; H02K 15/03; H02K 1/2766; H02K 21/14; Y10T 29/49012
USPC ................. 310/156.38, 156.53, 156.56, 152; 29/598; 335/306
See application file for complete search history.

(56) References Cited

U.S. PATENT DOCUMENTS

| | | | | |
|---|---|---|---|---|
| 5,191,256 A | * | 3/1993 | Reiter, Jr. | H02K 1/2726 310/156.38 |
| 5,237,301 A | * | 8/1993 | Unkelbach | B03C 1/10 335/302 |
| 5,347,253 A | * | 9/1994 | Ogikubo | A63F 9/12 273/239 |
| 6,340,857 B2 | * | 1/2002 | Nishiyama | H02K 1/276 310/156.21 |
| 6,359,359 B1 | * | 3/2002 | Miura | H02K 1/276 310/156.08 |
| 6,703,743 B2 | * | 3/2004 | Kaneko | H02K 1/276 310/156.02 |
| 6,891,298 B2 | | 5/2005 | Gary | |
| 7,498,708 B2 | | 3/2009 | Brown et al. | |
| 7,550,889 B2 | | 6/2009 | Horst | |

(Continued)

OTHER PUBLICATIONS

K. Kim et al., "A Study on the Characteristics Due to Pole-Arc to Pole-Pitch Ratio and Saliency to Improve Torque Performance of IPMSM," IEEE Transactions on Magnetics, vol. 43, No. 6, Jun. 2007, pp. 2516-2518.

(Continued)

*Primary Examiner* — John K Kim
*Assistant Examiner* — Noli Manaloto
(74) *Attorney, Agent, or Firm* — Pabitra K. Chakrabarti

(57) ABSTRACT

A component includes magnet elements adjoined to each other to form an arced segmented magnet section that is configured to fit in an a curved rotor slot gap of an electric machine. An electric machine that employs the component and method of assembly of the component are also disclosed. The present invention has been described in terms of specific embodiment(s), and it is recognized that equivalents, alternatives, and modifications, aside from those expressly stated, are possible and within the scope of the appending claims.

15 Claims, 3 Drawing Sheets

(56) References Cited

U.S. PATENT DOCUMENTS

| | | | |
|---|---|---|---|
| 7,598,645 B2 | 10/2009 | Ley et al. | |
| 7,898,137 B2* | 3/2011 | Miyata | H02K 1/278 310/156.38 |
| 7,932,658 B2 | 4/2011 | Ionel | |
| 7,973,442 B2* | 7/2011 | Takahashi | H02K 1/276 29/598 |
| 8,040,009 B2* | 10/2011 | Aota | H02K 1/276 310/156.38 |
| 8,102,091 B2 | 1/2012 | Ionel | |
| 8,138,651 B2 | 3/2012 | Rahman et al. | |
| 8,350,435 B2 | 1/2013 | Hoemann et al. | |
| 8,400,038 B2* | 3/2013 | Smith | H02K 1/2766 310/156.07 |
| 2002/0041128 A1* | 4/2002 | Nishiyama | H02K 1/276 310/156.53 |
| 2002/0070620 A1* | 6/2002 | Naito | H02K 15/03 310/156.56 |
| 2007/0108861 A1* | 5/2007 | Aoyama | H02K 1/276 310/156.38 |
| 2007/0159021 A1* | 7/2007 | Horst | H02K 1/2766 310/156.53 |
| 2008/0278021 A1* | 11/2008 | Ley | H02K 1/2766 310/156.38 |
| 2009/0140592 A1* | 6/2009 | Rahman | H02K 1/2766 310/156.53 |
| 2009/0224624 A1* | 9/2009 | Kumar | H02K 1/276 310/156.53 |
| 2010/0141076 A1 | 6/2010 | Blissenbach et al. | |
| 2010/0253169 A1* | 10/2010 | El-Refaie | H02K 1/2766 310/156.01 |
| 2011/0048827 A1* | 3/2011 | Cherney | B60K 6/46 180/65.245 |
| 2011/0079325 A1* | 4/2011 | Doi | H02K 1/2766 148/108 |
| 2012/0293033 A1 | 11/2012 | Hisada | |

OTHER PUBLICATIONS

K. Kim et al., "The Shape Design of Permanent Magnet for Permanent Magnet Synchronous Motor Considering Partial Demagnetization," IEEE Transations on Magnetics, vol. 42, No. 10, Oct. 2006, pp. 3485-3487.

M. Ashabani et al.., "Multiobjective Shape Optimization of Segmented Pole Permanent-Magnet Synchronous Machines with Improved Torque Characteristics," IEEE Transactions on Magnetics, Volume, 47, No. 4, Apr. 2011, pp. 795-804.

J. DeLaRee et al., "Magnet Shaping to Reduce Induced Voltage Harmonics in PM Machines with Surface Mounted Magnets," IEEE Transactions on Energy Conversion, vol. 6, No. 1, Mar. 1991, pp. 155-161.

* cited by examiner

SEGMENTED MAGNET COMPONENT FOR ELECTRIC MACHINE AND METHOD OF ASSEMBLY

BACKGROUND OF THE INVENTION

The present invention relates generally to electric machines and more particularly to a segmented magnet component for use in an electric machine and methods of assembling the segmented magnet component and electric machine.

Manufacturing of permanent magnets (PM) for use in electric machines, such as interior permanent magnet (IPM) machines, typically requires a cost-intensive mold and sinter process. Additionally, in order to provide the various PM shapes for the various shapes and configurations of slots, the magnets must be cut or milled Often multiple shapes and sizes of magnets are required for a single model of IPM machine. The magnets, once manufactured, are placed or inserted into the various slots in the rotor laminations. For example, as shown in FIG. 1, what often occurs is standard magnet sizes 170 (e.g., rectangles) are placed in the rows 160 of voids 165 of a rotor lamination 150. Often the magnets 170 end up inefficiently filling the spaces 165. This inefficient and expensive process further results in undesirable empty spaces or voids remaining in the slots between the inserted magnets and the lamination of the rotor. This inefficiency and cost also creates a disincentive in manufacturing rotor laminations that have curved rows of curved voids due to the difficulty in efficiently filling the curved voids.

Accordingly, there is an ongoing need for improvement of current electric machine manufacturing technologies that address at least one of complexity, cost, efficiency, and/or performance.

BRIEF DESCRIPTION

The present invention overcomes at least some of the aforementioned drawbacks by providing improvements to electric machines, such as IPM machines, so the machines may be both manufactured more efficiently in addition to providing a more technically efficient electric machines. More specifically, the present invention is directed to a segmented magnet component for use in an electric machine and a method of assembling the component into the electric machine. In an embodiment, a vehicle, such as an underground mining vehicle, may employ compact traction motors that utilize aspects of the present invention.

Therefore, in accordance with one aspect of the invention, a component comprises a plurality of magnet elements adjoined to each other, thereby defining an arced segmented magnet section, wherein the arced segmented magnet section is configured to fit in an a curved rotor slot gap of an electric machine.

In accordance with another aspect of the invention, an electric machine comprises: a rotor core comprising a plurality of laminations; a stator configured with a plurality of stationary windings therein; a plurality of curved rotor slot gaps disposed within the plurality of rotor laminations; and a segmented magnet component disposed in each of the plurality of curved rotor slot gaps.

In accordance with another aspect of the invention, a method comprises: adjoining a plurality of magnetizable segments next to each other, thereby defining an arced segmented magnet section, wherein each of the plurality of magnetizable segments are a same size and shape; inserting said arced segmented magnet section into a curved rotor slot gap of an electric machine rotor lamination; and magnetizing the arced segmented magnet section.

Various other features and advantages of the present invention will be made apparent from the following detailed description and the drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art with respect to the presently disclosed subject matter. The terms "first", "second", and the like, as used herein do not denote any order, quantity, or importance, but rather are used to distinguish one element from another. The terms "a", "an", and "the" do not denote a limitation of quantity, but rather denote the presence of at least one of the referenced item, and the terms "front", "back", "bottom", and/or "top", unless otherwise noted, are used for convenience of description only, and are not limited to any one position or spatial orientation.

If ranges are disclosed, the endpoints of all ranges directed to the same component or property are inclusive and independently combinable (e.g., ranges of "up to about 25 wt. %," is inclusive of the endpoints and all intermediate values of the ranges of "about 5 wt. % to about 25 wt. %," etc.). The modified "about" used in connection with a quantity is inclusive of the stated value and has the meaning dictated by the context (e.g., includes the degree of error associated with measurement of the particular quantity). Accordingly, the value modified by the term "about" is not necessarily limited only to the precise value specified.

Figure 1:
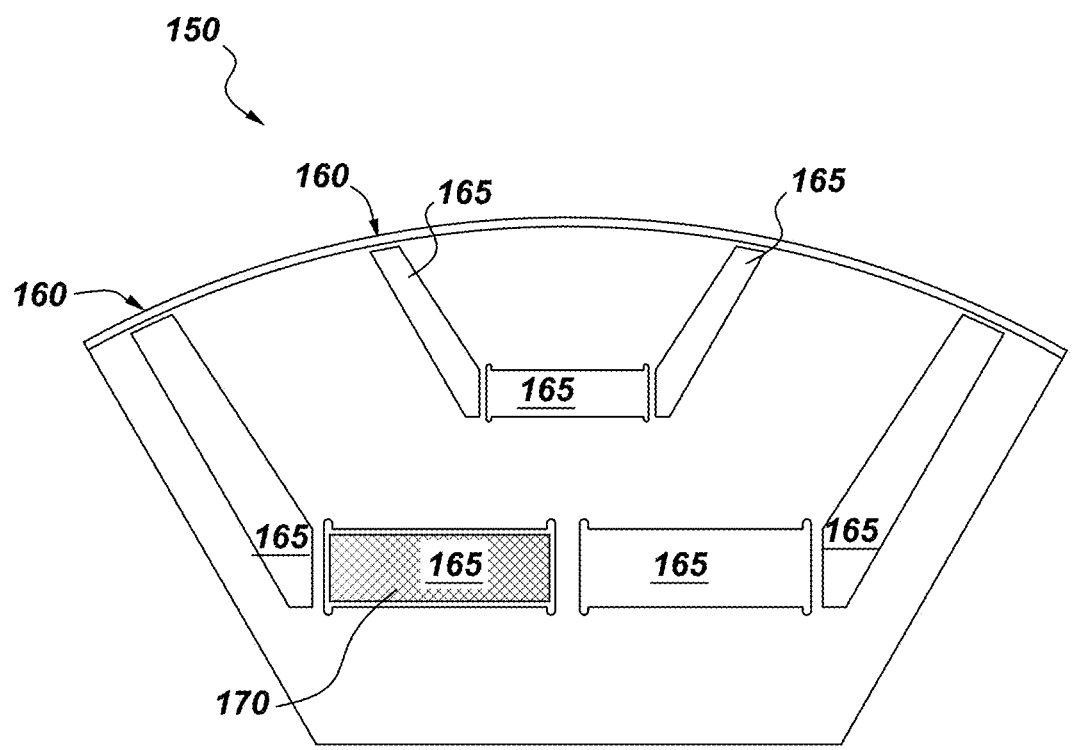
FIG. 1 is a plan view of a portion of a rotor of the related art.
Figure 2:
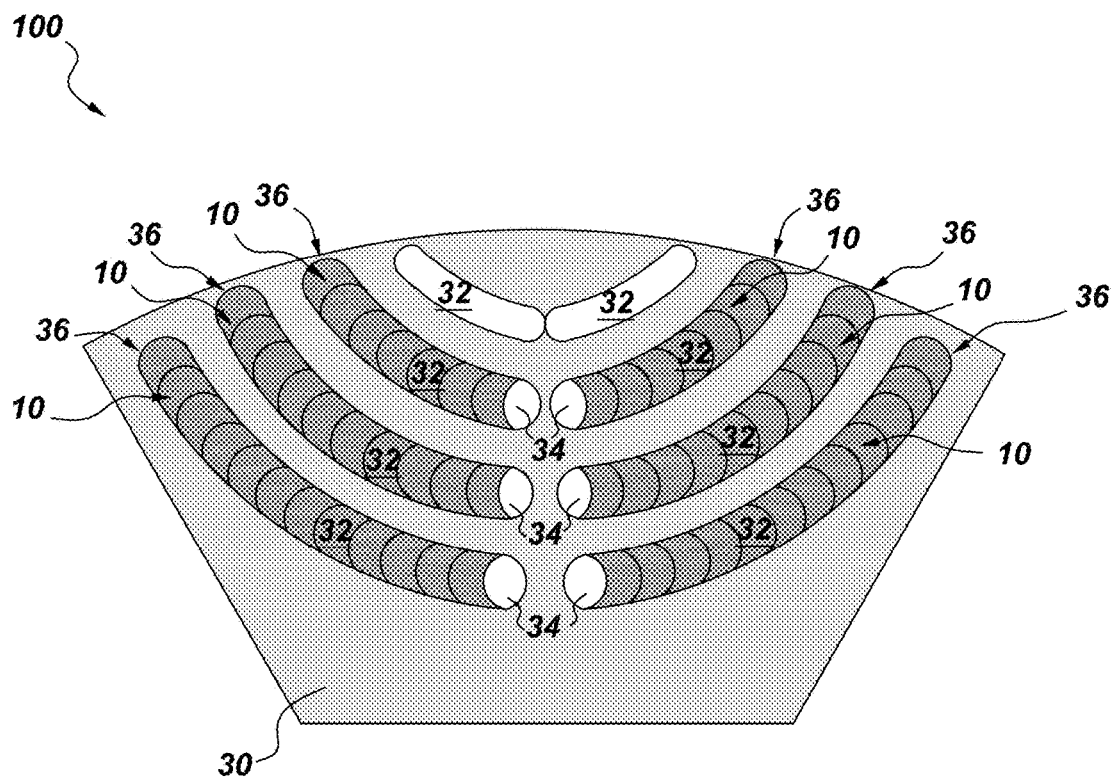
FIG. 2 is a plan view of a segmented magnet component and portion of a rotor according to an embodiment of the present invention.

Referring to FIG. 2, a plan view of a rotor structure component and portion of a rotor, according to an embodiment of the present invention, is depicted. The rotor component, or termed a segmented magnet component, or termed as component, is denoted by 10 and is shown in a portion of a electric machine 100. The portion of the electric machine 100 shown is a portion of a rotor lamination 30. As depicted, the portion of the electric machine 100 may comprise a portion of an interior permanent magnet (IPM) machine.

The rotor lamination 30 may comprise a plurality of rows of curved rotor slot gaps 32. As shown, there are four (4) rotor slot gaps 32, with the outermost curved rotor slot gap 32 being empty. The other three inward curved rotor slot gaps 32 each receive a curved rotor structure component 10. The unique configuration of the elements 12 and components 10 result in a significantly smaller remaining space, or void 34 in the rotor slot gap 32 after placement of the component 10. This smaller space, or void 34 between rotor slot gap 32, component 10, and lamination 30 ultimately leads to improved performance of the electric machine 100 (partially shown).

It should be noted that while the configuration shown in FIG. 2 depicts four rows of rotor slot gaps 32 wherein three of the four rows of rotor slot gaps 32 are filled with components 10, there are other embodiments and configurations possible. Clearly, other quantities of rows of rotor slot gaps 32 are possible. So too can other quantities, or ratios, of filling the rotor slot gaps 32 with components 10 be possible under aspects of the present invention. By non-limiting example, all of the rows of rotor slot gaps 32 may be filled with components 10, just as only a single row of the rows of rotor slot gaps 32 may be filled with a component 10. The fill (or non-fill) ratio of components 10 in (or not in) the rotor slot gaps 32 may be virtually any value.

Figure 3:
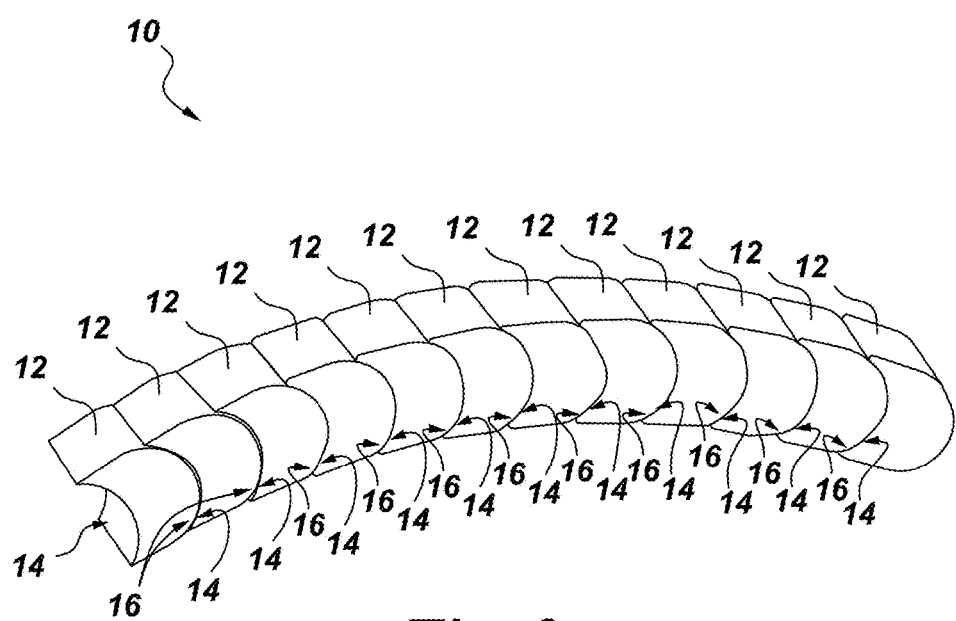
FIG. 3 is a top perspective view of a segmented magnet component according to an embodiment of the present invention.

Referring to FIG. 3, a perspective view of a portion of the rotor structure component, according to an embodiment of the present invention, is depicted. The component 10 is an arced magnetic segment comprised of a plurality of magnetizable elements, or elements, 12. Each of the plurality of magnetizable elements 12 comprises an element 12 having a first end, or concave end, 14 and a second end, or convex end, 16. As shown, each of the elements 12 may be the same size and shape. The plurality of elements 12 may be adjoined (e.g., placed, located, and/or connected) next to each other such that the first end 14 of a first element 12 is adjacent to the second end 16 of an adjacent second element 12. In this manner, an arced segment component 10 can be constructed of virtually any length and/or curvature suitable to fit inside a curved rotor slot gap 32 of a rotor lamination 30 of a machine 100 (See e.g., FIG. 2). Advantageously, aspects of the present invention allow for an improved filling factor of the curved rotor slot gaps 32. Further, aspects of the present invention allow for further capability and flexibility by constructing curved components 10 of virtually any angle that can readily fill any angle curved slot including curved slots that have curvature that changes over the length of the slot as well as uniform curvature. This may be achieved by the use of a magnetizable element 12 of a single shape and size.

The magnetizable elements 12 may comprise any suitable material including but not limited to, for example, Ferrite, Alnico, or rare earth metals, such as, NdFeB, Somarium-Cobalt, and the like. In certain embodiments, the magnetizable elements 12 may be adhered to each other via any suitable glue, adhesive, resin, and the like. Similarly, in other embodiments, the magnetizable elements 12 may be adjoined (but not adhered), to each other such that the magnetizable elements are dry fit, or friction fit, into the rotor slot gap(s) 32 (See e.g., FIG. 2).

Referring to FIGS. 4A-4E, plan views of various embodiments of the magnetizable elements 12 are shown. As depicted, different shapes for the element 12 may be employed without departing from aspects of the present invention. Each magnetizable element 12 may comprise a first end 14 and a second end 16. The magnetizable element 12 is configured in shape and size such that the first end 14 of a first element 12 is compatible with fitting with the adjoining second end 16 of an adjacent, second element 12. In this manner, a component 10 (See e.g., FIGS. 2 and 3) may be constructed from a plurality of adjoined magnetizable elements 12.

Figure 4A:
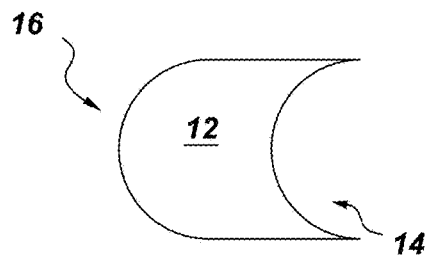
FIGS. 4A-4E are plan views of various embodiments of a single segment of a segmented magnet component, according to various embodiments of the present invention.
Figure 4B:
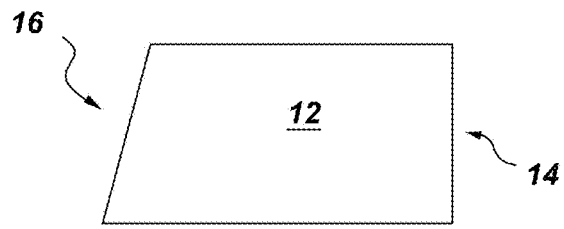
Figure 4C:
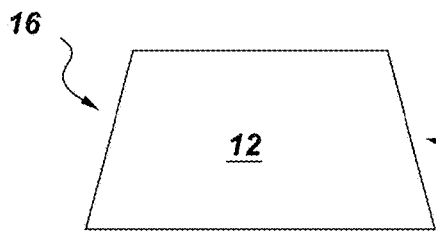
Figure 4D:
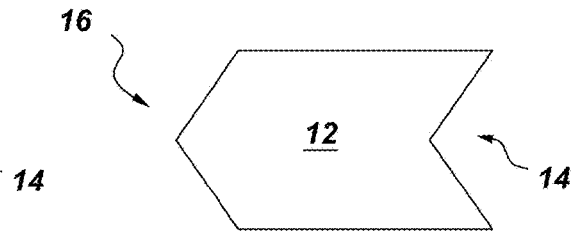
Figure 4E:
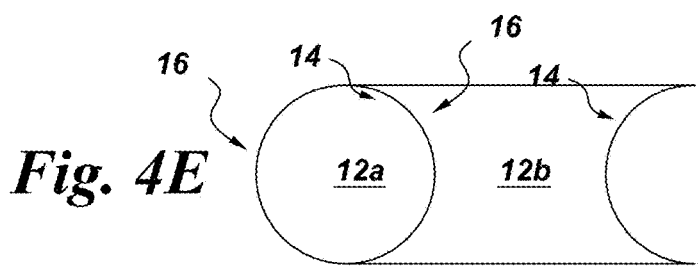

For example, FIG. 4A shows an embodiment of an element 12 having a concave first end 14 and a convex second end 16, wherein the shape may be termed "half-mooned". FIG. 4B shows an embodiment of an element 12 having a flat first end 14 and a slanted, or angled, second end 16, wherein the shape may be termed "right trapezoid". FIG. 4C shows an embodiment of an element 12 having both first end 14 and second end 16 that are slanted, wherein the shape may be termed "trapezoidal". In some embodiments, the angles of the first end 14 and second end 16 need not match. FIG. 4D shows an embodiment of an element 12 having a first end 14 being angled concave and a second end 16 being angled convex, wherein the shape may be termed "chevron". FIG. 4E shows two different elements 12a, 12b wherein the first element 12a is circular and the second element 12b that could be termed "double half-mooned" shape. The first element 12a has a first end 14 and a second end 16 that are both curved. Similarly, the second element 12b has a first end 14 and a second end 16 that are both convex. In this particular embodiment, it should be apparent that the two different shaped elements 12a, 12b may be placed adjoining each other, in an alternatingly pattern so that the first end 14 of the first (circular) element 12a is adjoined, or adjacent, to the second end 16 of the second element 12b, such that a curved component 10 may be constructed. Clearly, other shapes and configurations are possible without departing from aspects of the present invention.

The embodiments depicted in FIGS. 4A and 4E, for example, offer an advantage of providing the ability to readily construct segmented magnet components that are curved and can fit into curved slots of virtually any machine that has curved rotor slots (lamination or solid rotor core) from, in the case of the embodiment in FIG. 4A, a single sized/shaped component 12, and in the case of the embodiment in FIG. 4E, merely two sized/shaped components 12a, 12b.

Under aspects of the present invention, the components 10 and the electric machines 100 discussed herein may be used as a traction motor for virtually any vehicle. A vehicle support frame (not shown) may be connected to the one or more electric machine 100. Suitable vehicles for use include, but are not limited to, an off-highway vehicle (OHV), a locomotive, a mining vehicle, electric-motorized railcar, automobiles, trucks, construction vehicles, agricultural vehicles, airport ground service vehicles, fork-lifts, non-tactical military vehicles, tactical military vehicles, golf carts, motorcycles, mopeds, all-terrain vehicles, and the like.

Note that while various embodiments discussed herein describe a rotor core lamination 30 (see e.g., FIG. 2), it should be noted that other types of electric machine 100 constructs may be used without departing from aspects of the present invention. For example, the rotor core may, instead of be constructed of a plurality of laminations 30, be a solid rotor core (i.e., no laminations). In this type of solid rotor core embodiment, the magnetizable elements 12, for example, would typically be substantially deeper than the magnetizable elements 12 depicted in FIG. 3 for example. In this manner, the magnetizable elements 12 would have a length the same, or similar to, the length of the entire solid rotor core and/or the rotor slot gaps in the solid rotor core.

Figure 5:
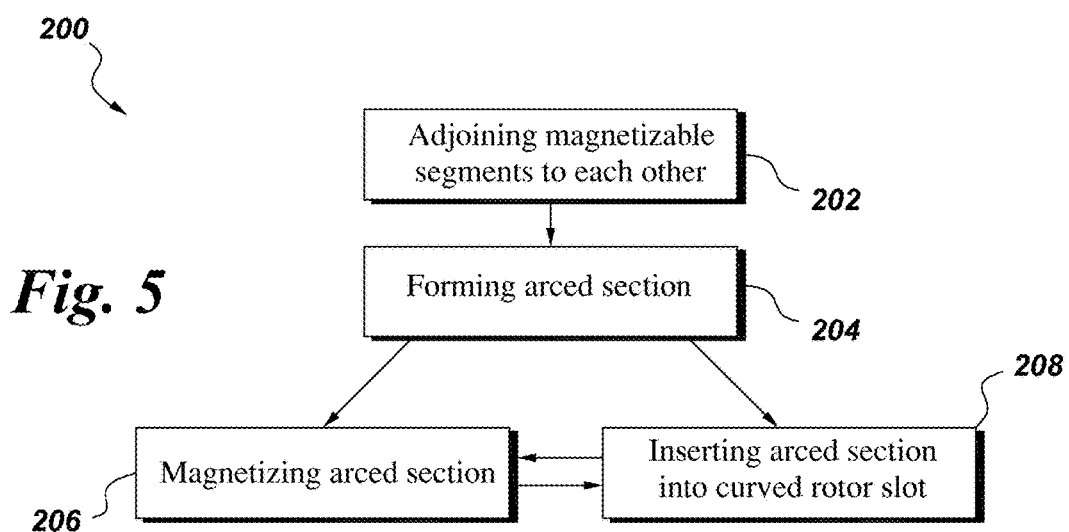
FIG. 5 is a flowchart of a method of assembly, according to embodiments of the present invention.

A flowchart depicting a method of assembly, according to aspects of the present invention, is depicted at FIG. 5. A method may comprise adjoining magnetizable segments to each other at 202. The magnetizable segments may be all of uniform size and shape. The bonding thereby forms an arced section at 204. Then at 206 the arced section is magnetized. At 208, the arced section (now magnetized) is inserted into a curved rotor slot on a rotor lamination. Alternatively, as shown in the flowchart, after 204, the arced section may be inserted into the curved rotor section on a rotor lamination at 208. Then, the arced slot (now inserted) is magnetized in situ at 206.

Therefore, according to one embodiment of the present invention, a component comprises a plurality of magnet elements adjoined to each other, thereby defining an arced segmented magnet section, wherein the arced segmented magnet section is configured to fit in an a curved rotor slot gap of an electric machine.

According to another embodiment of the present invention, an electric machine comprises: a rotor core comprising a plurality of laminations; a stator configured with a plurality of stationary windings therein; a plurality of curved rotor slot gaps disposed within the plurality of rotor laminations; and a segmented magnet component disposed in each of the plurality of curved rotor slot gaps.

According to another embodiment of the present invention, a method comprises: adjoining a plurality of magnetizable segments next to each other, thereby defining an arced segmented magnet section, wherein each of the plurality of magnetizable segments are a same size and shape; inserting said arced segmented magnet section into a curved rotor slot gap of an electric machine rotor lamination; and magnetizing the arced segmented magnet section.

While only certain features of the invention have been illustrated and/or described herein, many modifications and changes will occur to those skilled in the art. Although individual embodiments are discussed, the present invention covers all combination of all of those embodiments. It is understood that the appended claims are intended to cover all such modification and changes as fall within the intent of the invention.

What is claimed is:

1. A segmented magnet component for an electric machine, comprising:
a first arced segmented magnet section comprising a plurality of magnet elements of a single size and shape, wherein each of the plurality of magnet elements comprises a first concave end and a second convex end, wherein a second convex end of a first magnet element is compatible in shape with a first concave end of a second magnet element adjacent the first magnet element, wherein a second convex end of the second magnet element is compatible in shape with a first concave end of a third magnet element adjacent the second magnet element, and wherein the first, second and third magnet elements adjoin each other so as to define an arced segmented magnet section configured to fit in a curved rotor slot gap of an electric machine.

2. The component of claim 1, wherein the plurality of magnet elements are attached to each other.

3. The component of claim 1, wherein the arced segmented magnet section is configured to fit in a curved rotor slot gap of a rotor core, wherein the rotor core is solid.

4. The component of claim 1, wherein the arced segmented magnet section is configured to fit in the curved rotor slot gap of a rotor lamination of the electric machine.

5. The component of claim 1, wherein the plurality of magnet elements comprise a material of at least one of ferrite, alnico, and a rare earth metal.

6. The component of claim 1, wherein the shape of the plurality of magnet elements is half-mooned.

7. The component of claim 1, further comprising a second set of magnet elements wherein the shape of the plurality of magnet elements of the second set is circular.

8. The component of claim 1, wherein the electric machine comprises an Interior Permanent Magnet (IPM) machine.

9. The component of claim 8, wherein the electric machine comprises a traction motor.

10. The component of claim 8, wherein the traction motor is configured for an underground mining vehicle.

11. A rotor core component for an electric machine comprising:
a plurality of laminations;
a plurality of curved rotor slot gaps disposed within the plurality of rotor laminations; and
a segmented magnet component disposed in each of the plurality of curved rotor slot gaps, wherein the segmented magnet component comprises a plurality of magnet elements of a single size and shape, wherein each of the plurality of magnet elements comprises a first concave end and a second convex end, wherein a second convex end of a first magnet element is compatible in shape with a first concave end of a second magnet element adjacent the first magnet element, wherein a second convex end of the second magnet element is compatible in shape with a first concave end of a third magnet element adjacent the second magnet element, and wherein the first, second and third magnet elements adjoin each other so as to define an arced segmented magnet section configured to fit in a curved rotor slot gap of an electric machine.

12. The rotor core component of claim 11, wherein the electric machine is an interior permanent magnet (IPM) machine.

13. The rotor core component of claim 11, wherein the electric machine comprises a traction motor.

14. A method comprising:
adjoining a plurality of magnetizable segments of a single size and shape next to each other, thereby defining an arced segmented magnet section, wherein each of the plurality of magnetizable segments comprises a first concave end and a second convex end, wherein a second convex end of a first magnet element is compatible in shape with a first concave end of a second magnet element adjacent the first magnet element, wherein a second convex end of the second magnet element is compatible in shape with a first concave end of a third magnet element adjacent the second magnet element;
inserting said arced segmented magnet section into a curved rotor slot gap of an electric machine rotor lamination; and
magnetizing the arced segmented magnet section.

15. The method of claim 14, wherein the adjoining further comprises adhering the plurality of magnetizable segments to each other, thereby forming the arced segmented magnet section.

* * * * *